United States Patent [19]

Powers et al.

[11] Patent Number: 5,646,713

[45] Date of Patent: Jul. 8, 1997

[54] APPARATUS AND METHOD FOR EXPOSING DATA CHARACTERS ONTO A STRIP REGION OF MOVING PHOTOSENSITIVE MEDIA

[75] Inventors: Thomas Foster Powers, Webster; Kenneth Charles Gottschalk; Charles Robert Gordon, both of Rochester, all of N.Y.

[73] Assignee: Eastman Kodak Company, Rochester, N.Y.

[21] Appl. No.: 602,435

[22] Filed: Feb. 16, 1996

Related U.S. Application Data

[60] Provisional application No. 60/000,138 Jun. 13, 1995.

[51] Int. Cl.$^6$ .................. G03B 27/52; G03B 27/54; G03B 27/72
[52] U.S. Cl. .................. 355/40; 355/41; 355/67; 355/71
[58] Field of Search .................. 355/67, 71, 50, 355/40

[56] References Cited

U.S. PATENT DOCUMENTS

| | | |
|---|---|---|
| 3,212,399 | 10/1965 | Walter . |
| 3,603,974 | 9/1971 | Copeland . |
| 3,824,604 | 7/1974 | Stein . |
| 3,988,537 | 10/1976 | Cooley .................. 355/67 |
| 4,050,814 | 9/1977 | McFadden . |
| 4,229,095 | 10/1980 | Mir . |
| 4,366,500 | 12/1982 | Kurtz et al. . |
| 4,367,946 | 1/1983 | Varner . |
| 4,371,892 | 2/1983 | Mir . |
| 4,374,397 | 2/1983 | Mir . |
| 4,375,648 | 3/1983 | Mir . |
| 4,377,753 | 3/1983 | Mir . |
| 4,450,458 | 5/1984 | Araghi et al. . |
| 4,508,438 | 4/1985 | Kanaoka et al. . |
| 4,519,701 | 5/1985 | Kanaoka et al. . |
| 4,544,259 | 10/1985 | Kanaoka et al. .................. 355/40 |
| 4,551,008 | 11/1985 | Banton . |
| 4,553,833 | 11/1985 | Kanaoka et al. . |
| 4,659,198 | 4/1987 | Beauviala et al. .................. 355/40 |
| 4,701,046 | 10/1987 | Shiga et al. . |
| 4,797,691 | 1/1989 | Akiyoshi et al. . |
| 4,797,694 | 1/1989 | Agostinelli et al. . |
| 4,801,194 | 1/1989 | Agostinelli et al. . |
| 4,805,012 | 2/1989 | Agostinelli et al. . |
| 4,806,965 | 2/1989 | Yamanouchi et al. . |
| 4,854,696 | 8/1989 | Guez . |
| 4,912,503 | 3/1990 | Sawaki et al. . |
| 5,086,310 | 2/1992 | Iwashita et al. .................. 355/40 |
| 5,105,215 | 4/1992 | Liu . |
| 5,132,723 | 7/1992 | Gelbart . |
| 5,231,451 | 7/1993 | Uekusa et al. .................. 355/40 |
| 5,307,108 | 4/1994 | Yamanouchi et al. . |
| 5,521,748 | 5/1996 | Sarraf .................. 355/40 |

FOREIGN PATENT DOCUMENTS 2 227904  8/1990  United Kingdom .

*Primary Examiner*—Arthur T. Grimley
*Assistant Examiner*—Shival P. Virmani
*Attorney, Agent, or Firm*—Clyde E. Bailey, Sr.

[57] ABSTRACT

An electro-optic system and method for exposing data characters line segments on an edge region of rapidly moving strip film. The system includes a source of pulse illumination directed onto a light valve device that is addressed to form a plurality of discrete, multiple data character line segments. The illumination is synchronized with the film movement and the line segments are sequentially scanned to a strip image region to form a stitched, end to end, image of the line segments.

10 Claims, 5 Drawing Sheets

Fig. 5
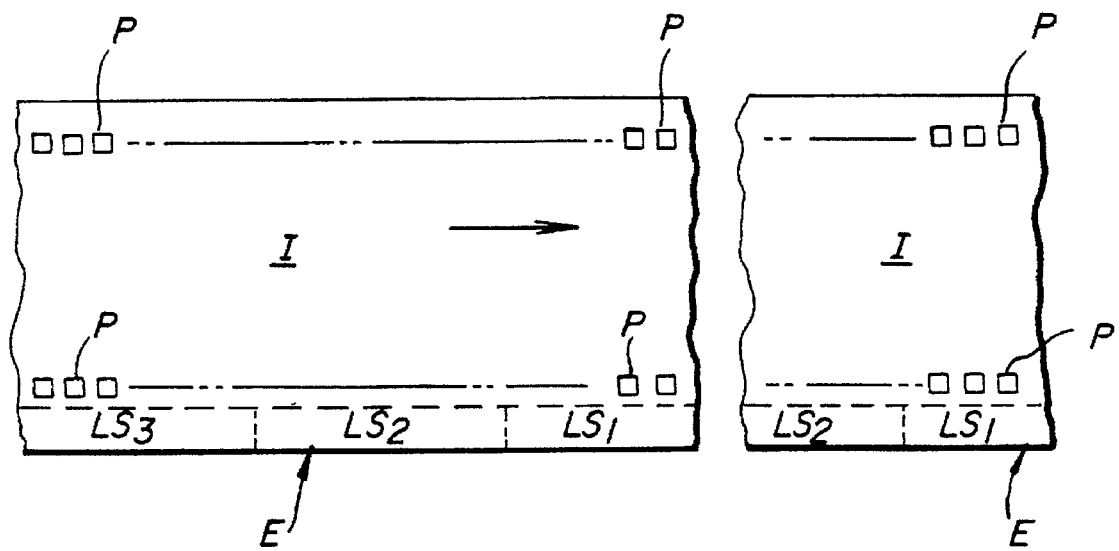
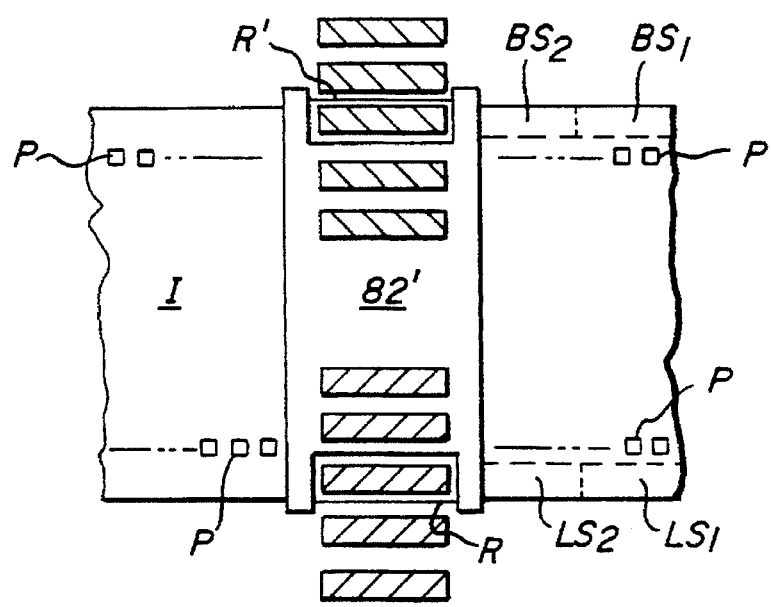
Fig. 6

APPARATUS AND METHOD FOR EXPOSING DATA CHARACTERS ONTO A STRIP REGION OF MOVING PHOTOSENSITIVE MEDIA

CROSS REFERENCE TO RELATED APPLICATION

Reference is made to and priority claimed from U.S. provisional application Ser. No. 60/000,138, filed 13 Jun. 1995, entitled APPARATUS AND METHOD FOR EXPOSING DATA CHARACTERS ONTO A STRIP REGION OF MOVING PHOTOSENSITIVE MEDIA.

FIELD OF INVENTION

The present invention relates to apparatus and method for exposing data onto photosensitive media and more particularly to apparatus and methods for the electro-optic exposure of data onto a strip region of moving photosensitive media such as an edge of a photographic film strip moving along a film spooling feed path.

BACKGROUND OF THE INVENTION

In one mode of the manufacture of photographic film, very long webs of a suitable support are coated with light sensitive emulsion layers and dried. The coated webs are then slit into a plurality of narrower strips, which are spooled and segmented into a plurality of film packages, e.g. film roll cartridges or cassettes. It is useful for quality control and other purposes to have data about the film, (e.g., manufacture identity, film emulsion type, roll frame numbers, etc.) printed on the film with alpha numeric characters or other data symbols, such as bar codes, all collectively referred to herein as "data characters". One convenient way to record particular film data is to expose the edges of the film that will not subsequently be used for picture images, with patterns of radiation (e.g. light) to which the film emulsions are imagewise sensitive. Thus, latent images of data character patterns are recorded along the film edge(s) and will be developed subsequently, after the picture areas are exposed by the camera user and processed by the photofinisher. Such data is helpful during subsequent photofinishing operations, e.g., for adjusting print exposures and identifying particular image frames.

One approach for recording such film edge data characters has been to provide stencil belts having light transmissive data characters portions that constitute the information to be recorded. The belts are located along the film-strip spooling path and moved in synchronism with the film-strip material, so that light directed toward the film through the belts transmissive portions will record the belt's data pattern repeatedly onto successive edge sections of the photographic film strip. This approach operates successfully; however, it has disadvantages. For example, new belts must be fabricated and installed in the spooler system whenever different film data is desired. Also, the rapid velocity of the film strips require correspondingly rapid velocity along the belt recirculation path, which makes a long belt life difficult to achieve.

U.S. Pat. Nos. 4,519,701 and 4,553,833 describe an electro-optic approach wherein light emitting diode (LED) arrays are selectively activated and imaged onto an edge region to record data on film strip media moving through a spooling system. These systems present problems in regard to the attainment of adequate light intensity to adequately record on the rapidly moving film edge; and complicated exposure control electronics and/or imaging optics are employed to achieve adequate exposure intensity. When arrays having a large number of such LED elements are used, the problem of addressing the arrays energizing circuitry to form different data characters becomes difficult. This addressing difficulty increases significantly as the rates of address (changing from one set of characters to others) increases. Since the high film velocity in spoolers necessitates high address rates, the use of LED arrays as described above leaves room for significant improvements. Also, printing with LED arrays requires continuous and very accurate tracking of the film position in order to coordinate the many, successive small portions of image exposure and make the overall image appear continuous. The high film velocity in spoolers presents image-quality difficulties for the LED approach.

Other electro-optic printer systems such as laser writers and cathode ray tube devices have been considered (see the Background discussion in the above cited '701 patent); however, the cost, complexity and difficulty in integrating such devices to image on rapidly moving film strip edges, motivates against the use of these devices.

Another class of electro-optic light writing devices utilizes light valve modulator assemblies (e.g. PLZT or LCD panels with pixel addressing electrode systems and sandwiching light polarizer and analyzer plates) to patternwise control the passage of a uniform light illumination beam that is directed to a print zone. U.S. Pat. No. 4,050,814 is exemplary of one such LCD (liquid crystal display) light valve assembly and U.S. Pat. No. 4,371,892 describes an exemplary light valve assembly using a PLZT (lanthanum doped lead zirconate titanate) panel. The PLZT kinds of light valve writing devices require individual address electrodes and drive circuitry for each picture element (pixel) of the array, so high resolution and rapid operation also are problems regarding these devices. U.S. Pat. Nos. 4,374,397; 4,375,648; 4,377,753 and 4,805,012 describe systems for interlacing the successive pixel actuations of a light valve array within a single line segment to enhance image resolution on that line and to reduce the complexity of the address and drive electronics. However, these systems write across the transverse width (x-direction) of a strip moving longitudinally (in the y-direction) and are not designed to perform edge data writing on a rapidly moving strip. Active matrix LCD panels using thin film transistor address systems are available and provide high resolution and contrast; however, the liquid crystal material requires a relatively long period (e.g. about 0.050 seconds) to completely reorient. This has motivated against use for printing on rapidly moving strips such as in film spoolers.

SUMMARY OF INVENTION

One significant purpose of the present invention is to provide improved electro-optic imaging systems which will facilitate data writing along the edge of a rapidly moving media, such as a film strip moving in a spooling system, and obviate the problems associated with prior art devices such as discussed above. Thus, one advantage of the present invention is the elimination of the need to replace stencil belts previously necessitated by data change or belt wear. In a related yet broader aspect, it is an object of the present invention to provide an improved electro-optic imaging system which allows the end to end stitching of different line printing segments of a multi-line light valve device. This approach provides the advantage of increasing the attainable printing rate without the problems regarding tracking, material orientation and electrode address rates as mentioned above.

In one aspect the present invention constitutes an electro-optical imaging system for exposing successive print line segments (comprising data characters) onto successive longitudinal strip regions moving rapidly therepast along a feed path. The imaging system includes: (i) a light valve device having a plurality of print line segment arrays, each including rows and columns of pixel portions, for selectively passing and blocking light to form line segments of data characters in response to the address and energization of their pixel portions, (ii) means for directing pulses of uniform illumination through the light valve device and into image focus at an image plane on the feed path; (iii) a scanner for scanning images of different line segments of the device sequentially onto a strip exposure region at the image plane and (iv) control means for effecting illumination pulses in timed relation with drive of the scanner and with movement of the strip regions so that print line segments are sequentially exposed in a stitched, end to end relation.

In another aspect the present invention constitutes a method for recording data characters along the edge of a photographic film strip and includes the steps of feeding such strip rapidly along a feed path through an exposure plane; imaging an area light valve device, onto the exposure plane; directing pulses of illumination towards the exposure plane via the light valve device; addressing the light valve device to transmit light patterns forming a plurality of discrete, multiple-data-character line segments and scanning the image of the light valve device across a strip region of the exposure plane in timed relation with the film feeding and the pulsing of illumination so that different, multiple data character segments are exposed respectively on successive linear edge segments of film strip fed through the image region of the exposure plane.

BRIEF DESCRIPTION OF DRAWINGS

The subsequent detailed description of the invention refers to the accompanying drawings wherein:

FIG. 5 is a schematic plan view illustrating the image and data areas on an exemplary film strip exposed according to the present invention;

FIG. 6 is a plan view showing an alternative exposing and mask embodiments in accord with the invention.

DETAILED DESCRIPTION OF THE INVENTION

Figure 1:
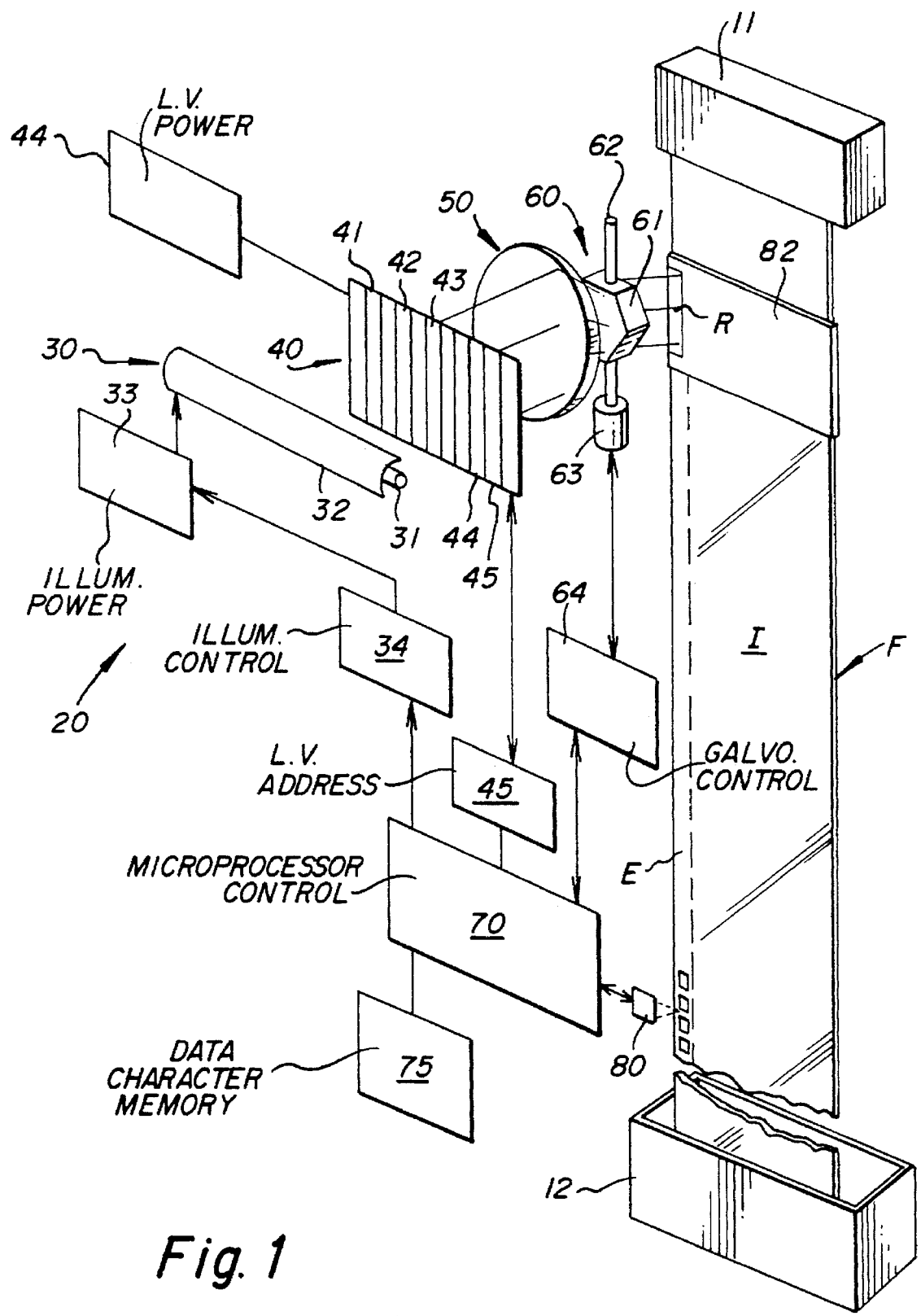
FIG. 1 is a perspective, schematic view of an exemplary film spooling system incorporating one embodiment of the present invention.

Referring to FIG. 1, one preferred embodiment of the invention is illustrated schematically as it can function to write character data along an edge strip region E of an elongated strip of photographic film F fed along a feed path between a supply 11 and a film spooling system 12. As noted above the film F is fed rapidly to the spooling system and there packaged in rolls, cassettes, cartridges etc. The electro-optic strip writing system 20 of the present invention exposes latent images of character data onto the region E, leaving the region I for the exposing of pictures by the consumer.

In general, the writing system 20 comprises a source of illumination 30 for directing exposure radiation pulses toward a area light valve device 40. The illumination passing light valve device 40 is directed by system optics, illustrated by field lens 50, to form an image of the device 40 at an exposure plane extending across the film surface moving past strip exposure region R. A scanner system 60, including a galvanometer mirror 61, is located along the light path between the device 40 and exposure region R to scan discrete, line segment, modulator portions of the light valve device across the exposure region.

More particularly, the illumination source comprises a flash lamp 31 and suitable reflector 32, which with the aid of suitable collimating optics (not shown) direct uniform illumination of the collimated light normally toward the face of the light valve device. An illumination power source 33 is connected to lamp 31 and illumination control 34 is coupled to system control 70 for triggering synchronized actuation of the flash pulses as subsequently described.

Figure 2:
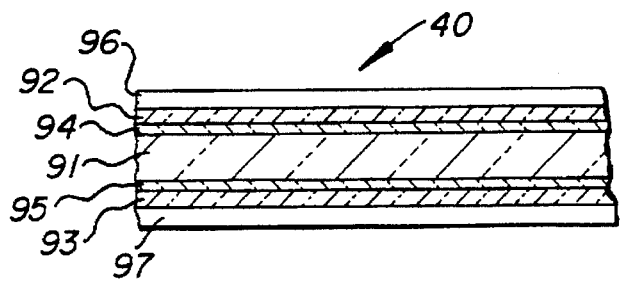
FIG. 2 is a cross-sectional view of a portion of one preferred light valve device in accord with the present invention.
Figure 3:
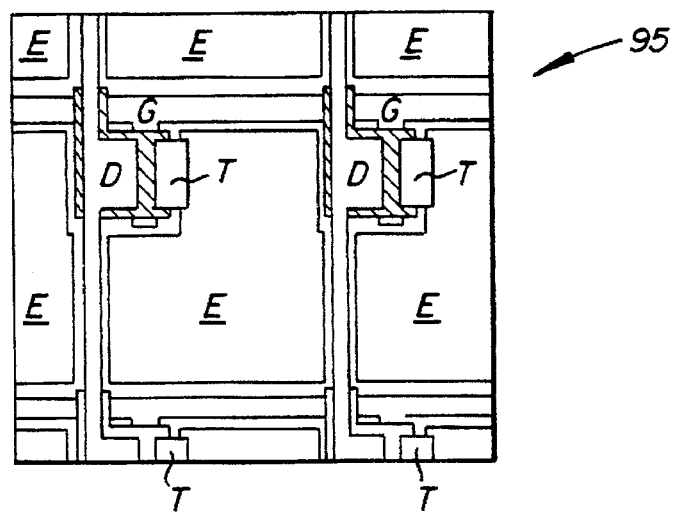
FIG. 3 is a schematic plan view of the FIG. 2 light valve portion.

The light valve device 40 can have various constructions. One preferred embodiment is an active matrix liquid crystal display 40 such as illustrated in FIGS. 2 and 3. In cross section the device shown in FIG. 2 includes a liquid crystal material 91 (e.g. twisted nematic material) sandwiched between thin glass elements 92 and 93 respectively having a transparent common electrode 94 and a thin film transistor (TFT) layer 95. Crossed light polarizes elements, e.g. polarizer layer 97 and analyzer layer 96 sandwich the liquid crystal layer and its addressing electrodes.

Figure 4:
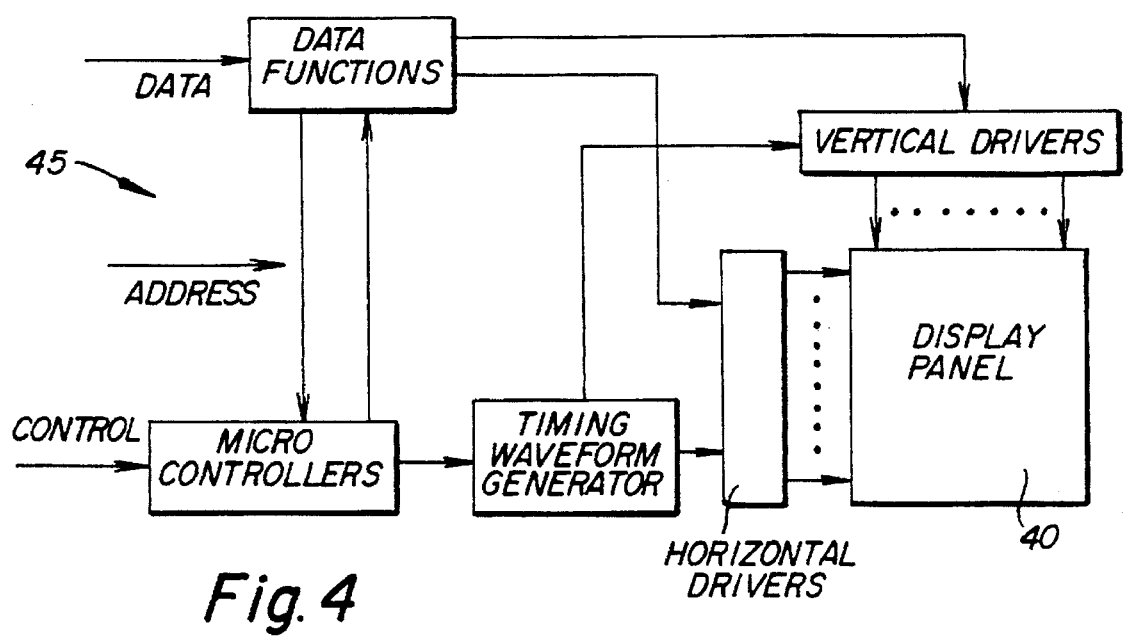
FIG. 4 is a block diagram of one preferred light valve address system in accord with the present invention.

FIG. 3 shows a portion of one preferred TFT layer construction denoted generally 95 to comprise transparent pixel areas covered by a transparent conductive film elements E discretely addressable by a transistors T, each having gates G and drains D. Thus, the individual cells of device 40 can be individually actuated to a light transmissive or light blocking condition by applying voltage selectively to elements E, which causes the liquid crystal material therebeneath to reorient. FIG. 4 shows, in block diagram form, one useful video interface circuit for addressing an active matrix light valve device 40. Many other circuit configurations will occur to those skilled in the art.

While various alternative light valving elements can be utilized, according to a preferred aspect of the present invention the light valve device 40 comprises a plurality of discretely addressable modulator portions, each including x-y pixel matrices of sufficient resolution to write a line segment of character data. One preferred light valve device is an active matrix, liquid crystal display system having approximately 640 by 480 pixels. This can be addressed by address circuitry 45, e.g., video interface control circuitry, to provide about 20 different modulator portions, for respectively printing different multiple character line segments. A Sharp LCD, Model LQ-36E03 is one such device. The individual linear modulator portions, e.g. 41, 42, 43, 44 and 45 shown in FIG. 1, are desirably disposed in mutually parallel relation and are linearly juxtaposed so that their ends are aligned along normals to their length direction.

The mirror 61 of scanning device 60 is mounted for rotation on an axis 62 that is spaced from and parallel to the longitudinal axes of linear arrays 41–45. More particularly, the mirror 61 is located with respect to light valve device 40 and exposure region R so that it is along the optical path, schematically illustrated by lens 50, of the light passing through the light valve device into imaging focus at the plane containing strip exposure region R, which is defined by mask element 82. Moreover, the axis of rotation 62 is located so that, as the mirror 61 is rotated thereon by galvanometer drive 63 and synchronization control 64, successive line segment patterns from portions 41–45 of device 40 are sequentially scanned into alignment with the strip region R. An M3 Series optical scanner and driver made by General Scanning, Inc., is one useful type.

As illustrated schematically in FIG. 1, a system control 70 comprising a microprocessor having a suitable video frame store for receiving data from a buffer memory that contains the character data to be printed, is coupled to interact with the film spool system 12, the galvanometer control 64, the illumination control 33 and the light valve device address electronics 45.

In operation, the control 70 detects the position of the film by means of position sensor 80 which can detect for example, edge perforations P, and synchronizes sequential light pulse actuations of source 30, in timed relation with the rotation of mirror 61, so as to effect the exposure of successively "stitched"data character line segments $LS_1$, $LS_2$ and $LS_3$ on the edge of film F, (see FIG. 5). More particularly, signal bits representing character data to be printed on line segment $LS_1$, $LS_2$, etc., are loaded by control from memory 75 into the framestore of the microprocessor and thence to the address electronics 45 for device 40. Thus, prior to the start of printing all line segments modulator portions of the device 40 are addressed with their assigned data characters and allowed to "orient" with the liquid crystal molecules in proper position. Also, mirror 61 is driven to a position for directing the image of portion 41 (corresponding to $LS_1$) into exposure region R.

When the film position sensor 80 signals a print start position to control 70, flash lamp 30 is triggered. The flash pulse is imagewise modulated by device 40 and quickly exposes a latent image onto the film at exposure region R without due to film movement. The film feed progresses toward spool system 12 and as the film section $LS_2$ is advanced to region R mirror 61 is driven to a position where the portion 42 of device 40 is imaged at the exposure region R. Also during this time the character data printed from $LS_1$ is updated in the control 70 and electronics 45. When the film has advanced a proper amount, e.g. the desired pitch for the print segment images, the control 70 triggers another flash pulse from source 30. At this stage control 70 and control 64 have moved mirror 61 so that the image passed by modulator portion 42 (corresponding to $LS_2$ is now focused at the region R to expose the latent image $LS_2$ in a "stitched" (i.e. trailing end to leading end) relation. Similarly, in the next stage, mirror 61 is driven to a position where the portion of light valve device 40 that corresponds to $LS_3$ (i.e. portion 43) can be imaged on region R. after the light valve device 40 is updated, the flash pulse is triggered to expose the latent image $LS_3$ in stitched relation to latent image $LS_2$. Thus, it can be appreciated that the address circuitry for light valve device 40 can be loading the frame store and video interface address electronics (allowing their corresponding LCD portions to orient) while subsequent exposures, e.g., $LS_3$, $LS_4$ etc. are made. This provides a multiplexing capability that allows faster operation of the spooling system. It will be appreciated that additional sequential regions can be added to device 40 to further enhance the multiplex capability.

FIG. 6 shows an alternative embodiment of the invention, where a light valve device 40 has two groups of modulator portions constructed and located to expose line segment regions $LS_1$, $LS_2$ etc. and bar code segment regions $BS_1$, $BS_2$, etc, through aperture plate 82 having openings at opposing strip edge regions.

Figure 7:
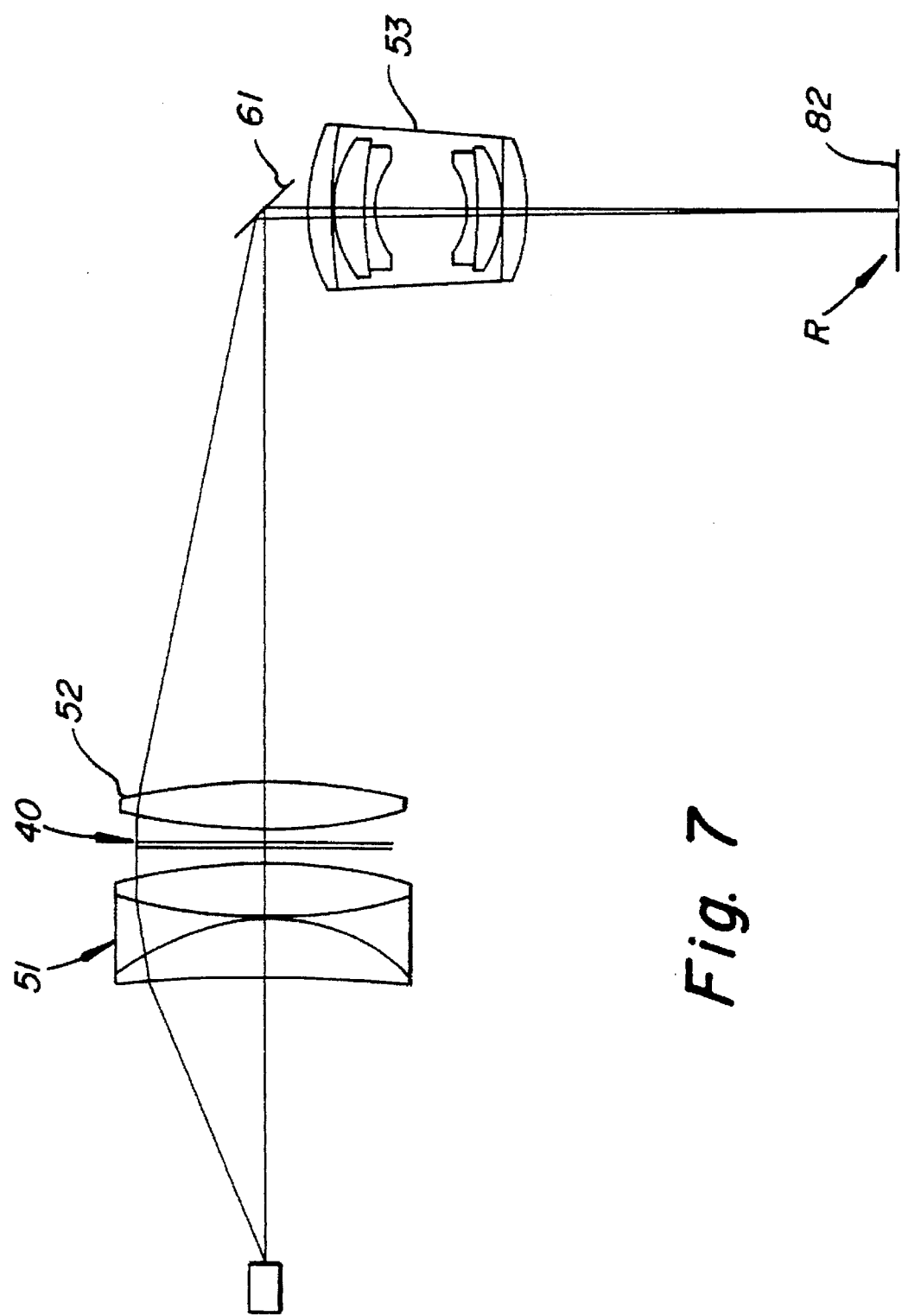
FIGS. 7 and 8 are schematic views showing alternative more detailed optical systems in accord with the invention.

FIG. 7 shows one preferred optical system for imaging the light valve device 40 onto the exposure region R. This embodiment employs a condenser lens 51 to provide uniform illumination directed through light valve device 40 and a field lens 52 to direct the light from device 40 onto mirror 61. A projection lens system 53 directs the light image from mirror 61 to the exposure plane R at suitable magnification (to achieve a size increase or decrease of the array). A slitted aperture plate 82 is provided to block the unwanted portions of the image from the light valve device.

Figure 8:
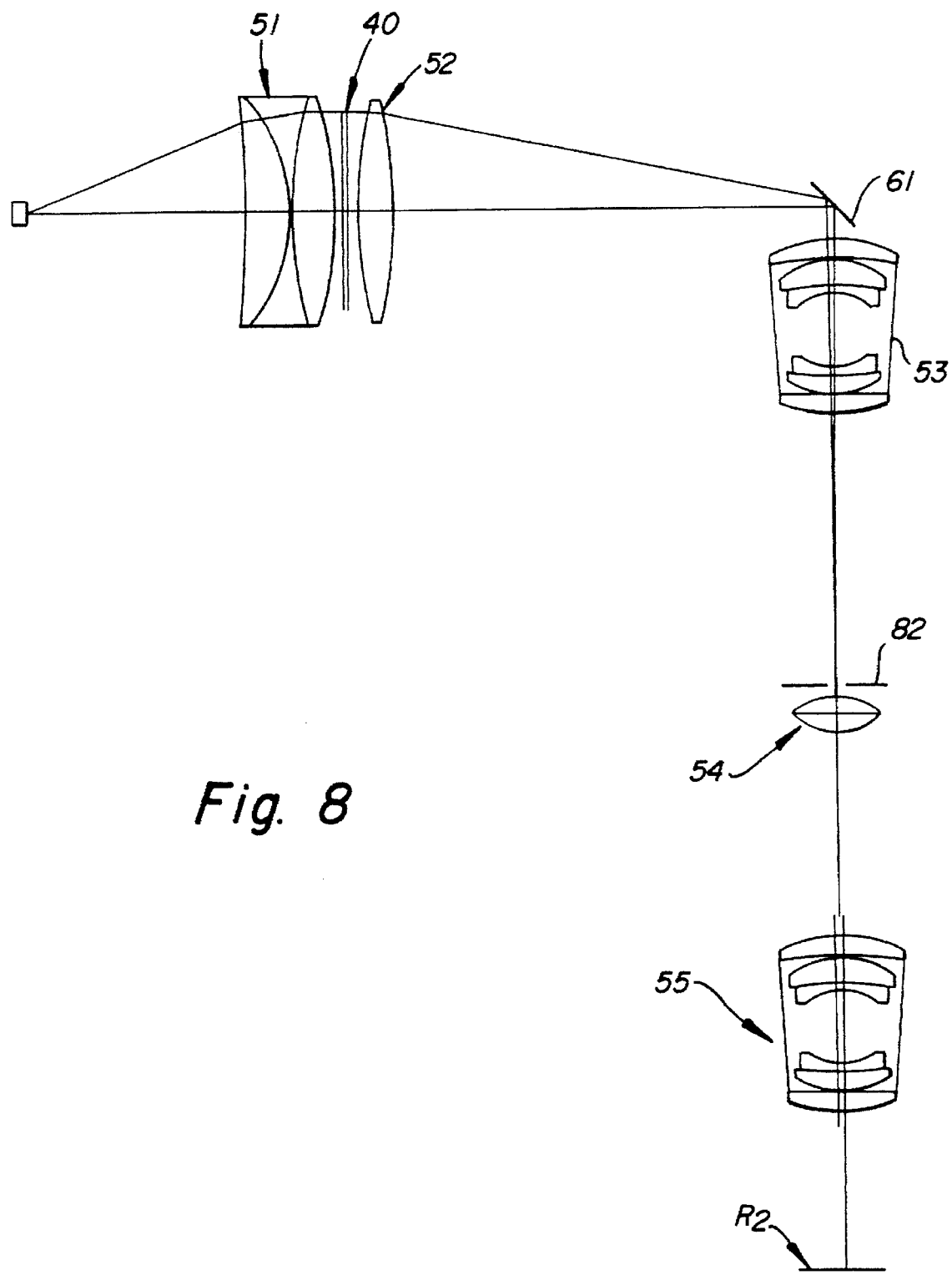

FIG. 8 shows another embodiment similar to that shown in FIG. 7. In this optical system a field lens 54 is located opposite aperture plate 82 and a second projection lens system 55 is provided to reimage the portion of the light valve device image passing through aperture 82 to exposure region $R_2$.

The invention has been described in detail with reference to particular preferred embodiments, but it will be understood that variations and modifications can be effected within the spirit and scope of the invention.

I claim:

1. In a photographic film packaging system having means for feeding film strip material along a transport path, an improved system for writing data characters on the edge of such film strip material comprising:

(a) illumination means for directing pulses of flood illumination along an exposure path;

(b) light valve means comprising an x-y pixel matrix which can be addressed to form a plurality of discrete line segment modulator portions located in parallel relation with their ends aligned along a normal to the line segment direction;

(c) means for imaging said modulation portions at an image plane extending across a linear edge strip segment of said film transport path;

(d) means for scanning images of different ones of said modulator portions in succession onto an imaging region located at said linear edge strip segment of said image plane; and (e) control means for (i) actuating the different modulator portions to selectively pass light for printing a predetermined line segment (ii) driving said scanning means to direct the image of different modulator portions successively onto said imaging region and (iii) triggering said illuminating means to provide a light pulse in synchronism with the drive of said scanning means, whereby successive line segments of character data are exposed in longitudinally stitched relation along the edge of a film moving along said transport path.

2. An electro-optical imaging system for exposing successive print line segments, of data characters, onto successive longitudinal strip regions moving rapidly along a feed path, said system comprising:

(a) a light valve device including a plurality of print line segment arrays, each including rows and columns of pixel portions for selectively passing and blocking light to form line segments of data characters in response to address of such pixel;

(b) illuminating means for directing pulses of uniform radiation to said light valve device;

(c) lens means for imaging radiation patterns passing said light valve device to an image plane along said feed path;

(d) scanner means, located between said light valve device and said image plane for scanning the images of different line segments sequentially onto a longitudinal exposure region at said image plane; and (e) control means for sequentially pulsing said illumination means in timed relation with the drive of said scanner means and with the movement of said strip along said feed path so that linear segments of data characters are sequentially exposed in a stitched, end to end relation along such strip as it moves through said longitudinal exposure region.

3. The invention defined in claim 2 wherein said print line segments are independently addressable to form different multi-character patterns.

4. The invention defined in claim 3 wherein the print line segments of said light valve device are disposed in parallel, adjacent locations with their respective ends aligned along normals to their linear direction.

5. The invention defined in claim 3 further comprising a data character line segment buffer memory and means for addressing different ones of said light valve segments with different data character line segments from said buffer memory.

6. The invention defined in claim 5 further comprising frame store means receiving character data from said buffer memory and addressing said light valve segments.

7. The invention defined in claim 6 wherein said control means controls said illumination means to provide illumination pulses in timed relation with said strip feeder means and said scanner means.

8. A method for recording data characters along the edge of a rapidly moving photographic film strip comprising the step of:

(a) feeding the strip along a feed path through an exposure plane;

(b) imaging an area light valve device onto said exposure plane;

(c) scanning the image of said area array across a strip image region of said exposure plane in timed relation with the feeding of said strip so that discrete multiple-data-character print line segments are exposed on successive linear edge film strip segments fed through said strip image region of said exposure plane.

9. The method defined in claim 8 wherein said imaging step comprises addressing said light valve device to form light passing patterns corresponding to desired print line segments and directing pulse illumination upon said device in timed relation with said strip feeding and image scanning.

10. The invention defined in claim 9 further comprising the step of addressing said light valve device to change for light control modulation patterns for on print line segment while another light valve array is scanned onto said strip image region.

* * * * *